(12) United States Patent
Oringer

(10) Patent No.: US 7,805,966 B1
(45) Date of Patent: Oct. 5, 2010

(54) HAND BRAKE LOCK

(75) Inventor: Omri Oringer, Ra'anana (IL)

(73) Assignee: Double O Tech (2009) Ltd., Ra'anana (IL)

( * ) Notice: Subject to any disclaimer, the term of this patent is extended or adjusted under 35 U.S.C. 154(b) by 0 days.

(21) Appl. No.: 12/542,013

(22) Filed: Aug. 17, 2009

(51) Int. Cl.
*F16H 57/00* (2006.01)

(52) U.S. Cl. .............................. 70/202; 70/199; 70/237

(58) Field of Classification Search .................. 70/181, 70/199–203, 237
See application file for complete search history.

(56) References Cited

U.S. PATENT DOCUMENTS

| | | | | |
|---|---|---|---|---|
| 3,777,518 A | * | 12/1973 | Meyers | 70/200 |
| 4,825,671 A | * | 5/1989 | Wu | 70/238 |
| 4,835,999 A | * | 6/1989 | Chant | 70/238 |
| 4,936,120 A | * | 6/1990 | Fiks | 70/202 |
| 5,038,667 A | * | 8/1991 | Slater | 70/199 |
| 5,291,764 A | * | 3/1994 | Chang | 70/202 |
| 5,311,756 A | * | 5/1994 | Villani | 70/247 |
| 5,404,736 A | * | 4/1995 | Lugo | 70/168 |
| 5,673,576 A | * | 10/1997 | Chen et al. | 70/199 |
| 5,791,175 A | * | 8/1998 | Van Wyk | 70/247 |

* cited by examiner

*Primary Examiner*—Suzanne D Barrett
(74) *Attorney, Agent, or Firm*—The Law Office of Michael E. Kondoudis

(57) ABSTRACT

A vehicle security system for securing a vehicle against theft. One system comprises a driving function disablement component having a first portion configured to substantially permanently affix to a moveable vehicle component, and a second component configured to removably attach to the first portion and disable the movable vehicle component.

6 Claims, 2 Drawing Sheets

HAND BRAKE LOCK

BACKGROUND

1. Technical Field

The present invention relates to the field of automobile anti-theft locks, and more particularly, to automobile anti-theft lock that applies to a hand brake.

2. Discussion of Related Art

Mechanical vehicular locking devices that lock a manually operated vehicle component provide some form of physical impediment to the normal operation of the vehicle.

The mechanical steering-wheel locking crosspiece, for example, comprises a lockable crosspiece that is manually biased and locked against a vehicle steering wheel. One end of the crosspiece typically extends outward of the steering wheel so that upon rotation, the end contacts a surface associated with the vehicle passenger cabin, thereby preventing full rotation of the steering wheel.

The steering-wheel locking crosspiece is easily spotted through the vehicle windows, thereby acting as a visual deterrent to a would-be vehicle thief. Electronic immobilizers that are not visible, for example, may not provide a deterrent until the thief has already entered the vehicle; often following damage to the vehicle door locks and/or windows.

The locking steering wheel crosspiece, however, is bulky and can be a nuisance to put in place and lock, for example during multiple routine shopping stops.

BRIEF SUMMARY

Embodiments of the present invention provide a vehicle security system for securing a vehicle against theft. One system comprises a driving function disablement component having a first portion configured to substantially permanently affix to a moveable vehicle component and a second component configured to removably attach to the first portion and disable the movable vehicle component.

Accordingly, according to an aspect of the present invention, the second component comprises a locking mechanism for locking the driving function disablement component in the biased position.

According to some embodiments of the invention, the first portion is configured to affix to a hand brake lever.

According to some embodiments of the invention, the manually activated locking mechanism comprises a lock barrel configured to receive a user-deployable key.

According to some embodiments of the invention, the manually operable key cylinder is configured to manually release the biasing when the cylinder is turned in a counter clockwise direction.

According to some embodiments of the invention, the disablement component is configured to be manually removed from the component following releasing the biasing in the component.

According to some embodiments of the invention, the driving function disablement component comprises a box configured to encompass an end portion of a brake lock.

According to some embodiments of the invention, the driving function disablement component comprises at least one first projection configured to press against a portion of the moveable vehicle component when the disablement component is in the biased configuration.

According to an aspect of some embodiments of the present invention, there is provided a method of temporarily disabling and re-enabling a vehicle. The method comprises fitting a first portion of a biasable locking component over a driving component, and locking a second portion of the biasable locking component on the first portion in a biased position to disable the driving component.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which:

FIGS. 2-3A show implementation of the brake lock shown in FIG. 1, according to some embodiments of the invention.

DETAILED DESCRIPTION

Figure 1:
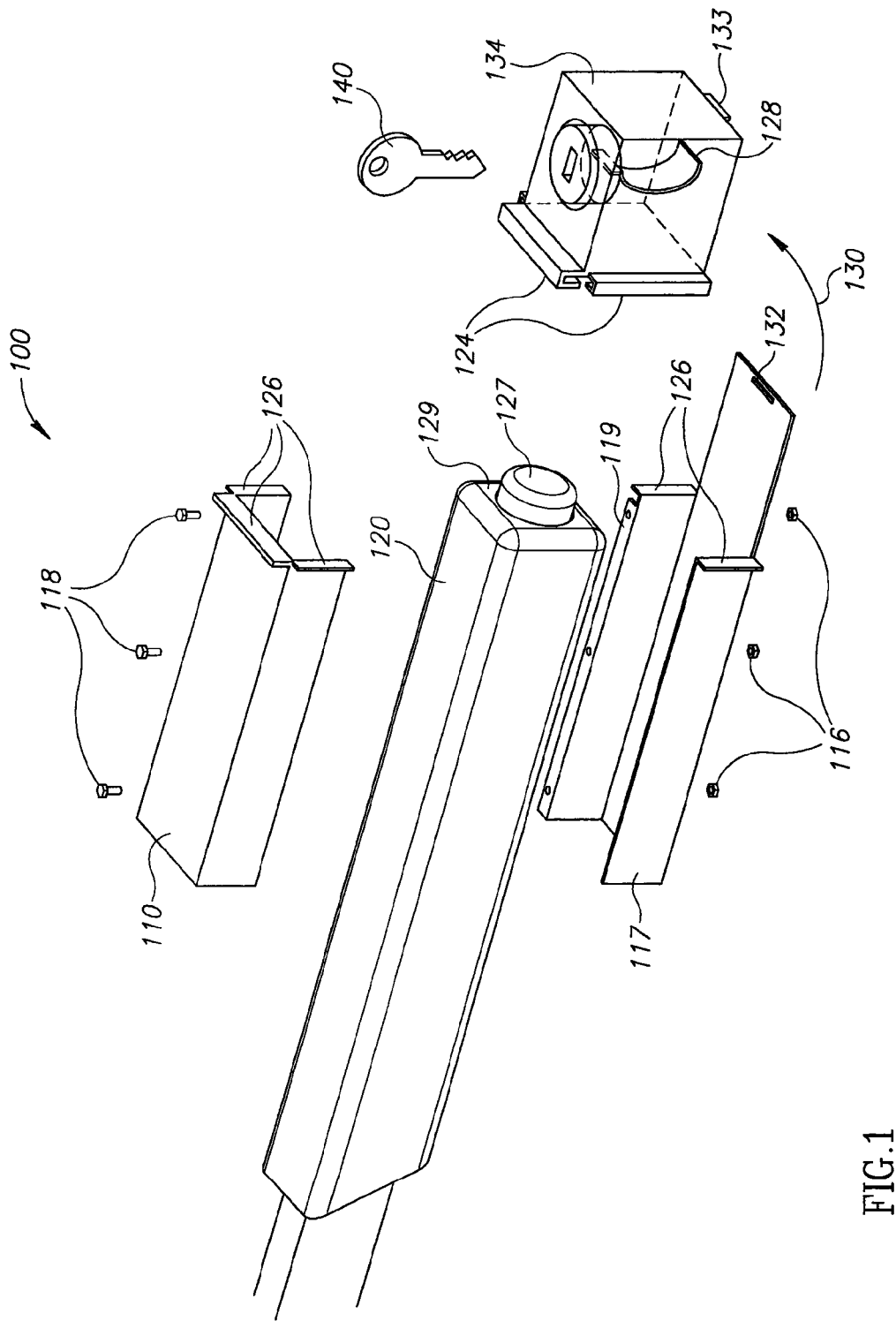
FIG. 1 shows an exploded view of a brake lock, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 shows an exploded view of a brake lock assembly 100, in which a sleeve 110 is tightened around a brake handle 120 with nuts 116 and bolts 118 and permanently remains in place on brake handle 120.

Optionally, a glue, for example an epoxy, may be placed along a panel 117 and/or a lip 119 to ensure that sleeve 110 is maintained in assembled form even under removal attempts by a thief.

Additionally or alternatively, glue, for example epoxy, may be placed around brake handle 120 to glue sleeve 110 in position. In still further options, connectors, for example screws, may be screwed through sleeve 110 into brake handle 120.

In still further options, sleeve 110 may be manufactured as an integral part of brake handle 120. In such cases, brake handle 120 with integrated sleeve 110 may be sold as an aftermarket replacement for non-locking hand brake handle 120; or offered as a factory option to the car buyer.

The many options for securing sleeve 110 to brake handle 120 and producing brake lock assembly 100 are well known to those familiar with the art.

Figure 2:
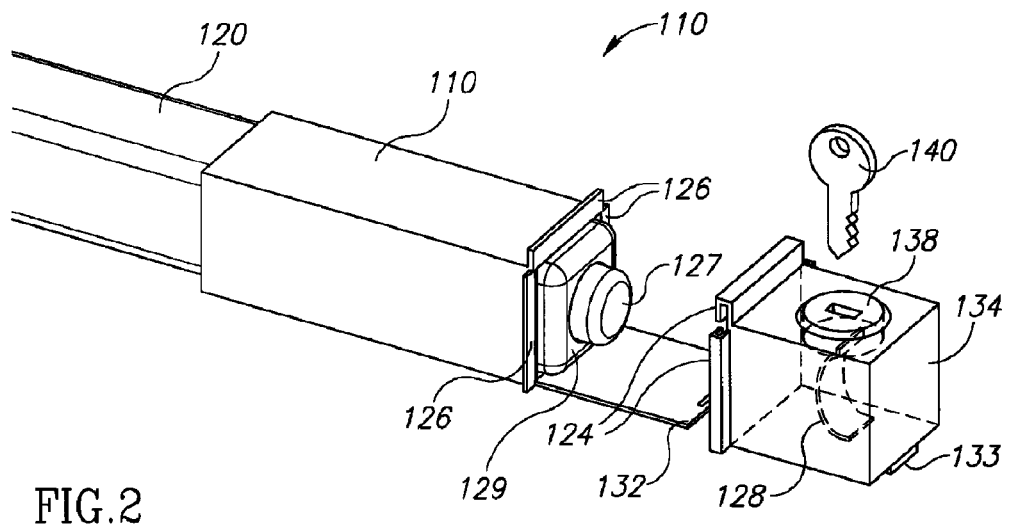
Figure 3A:
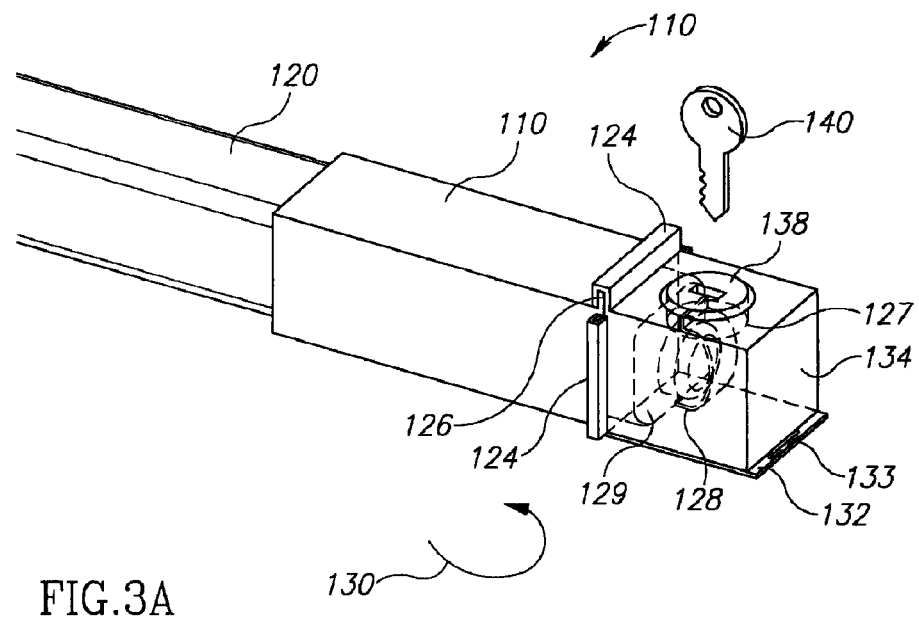

FIGS. 2-3A show implementation of brake lock assembly 100 in which a ledge 124 is placed over a lip 126, and an aperture tab 133 secures in a tab receptacle 132.

While a standard key 140 and a cylinder 138 are pictured, it is well known to many types of keys 140 and cylinders 138 that are available and have configurations that are considered to be burglar proof.

As seen in FIG. 3A, cylinder 138 has been rotated in a circular direction 130 so that a cylinder extension 128 rotates to curve around a brake lock button 127.

The lower portion of lock extension 128 rests against a brake lock facing 129, for example, to prevent a would-be thief from boring into brake lock assembly 100 with a sharp object, and depressing brake lock button 127 by creating a jamming force against lock extension 128.

Additionally, the bottom edge of lock extension 128 secures below brake lock button 127 so that ledges 124 cannot be slid upward to disengage from lips 126; and aperture tab 133 cannot be disengaged from tab receptacle 132.

Figure 3B:
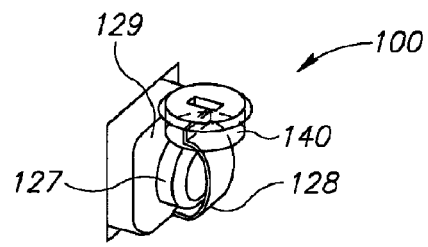
FIG. 3B shows a detailed view of a portion of the brake lock shown in FIG. 3A, according to some embodiments of the invention.

FIG. 3B shows a detailed view of a portion of lock extension 128 curving around brake lock button 127 so that the lower portion of lock extension 128 rests against front brake lock facing 129.

In embodiments of brake lock assembly 100, aperture tab 133 and tab receptacle 132 comprise a hinge (not shown) so that the driver may unlock cylinder 138 and swivel a lock box 134 (FIG. 3A) in an upward direction so that ledges 124 can be slid upward to disengage from lips 126. With forward box swiveled into an upward position, the driver can access and press brake lock button 127.

Further embodiments of the present invention may comprise a lit diode on sleeve 110 that can be easily identified by a would-be burglar, thereby acting as a deterrent to the situation where the burglar damages the car, and only then discovers that the car is disabled by brake lock assembly 100.

In alternative embodiments a sticker may be placed on a window of the vehicle that warns a potential burglar that the car has been effectively disabled and will not make a good target for theft. Such a warning could potentially prevent the burglar from breaking a vehicle window prior to discovering that the vehicle has been disabled.

Brake lock assembly 100 may be manufactured from a wide variety of burglar resistant materials, including polyethylenes, metals, and Kevlar.

The inventor has discovered that brake lock assembly 100 may possibly provide a visible deterrent to car thieves breaking into a car, as noted above.

Additionally, the inventor has discovered that sleeve portion 110 attached to brake handle 120 on a permanent basis, reduces the bulk of the manual locking components with respect to, for example, the above-noted steering wheel bias; and therefore can provide a more convenient vehicle disabling device.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A vehicle security system for securing a vehicle against theft, the vehicle comprising a hand brake lever with a brake lock button that is to be pressed to release the hand brake, the system comprising a driving function disablement component having an affixed portion and a removable portion, wherein the affixed portion is permanently affixed to the hand brake lever, and the removable portion is removably attached to the affixed portion, such that the removable portion blocks access to the brake lock button when attached to the affixed portion, and access to the brake lock button is allowed when the removable portion is removed from the affixed portion, wherein the removable portion is locked to the affixed portion with a locking mechanism, which comprises an extension rotatable to and from a locked position, wherein in the locked position the extension is curved around the brake lock button so as to lock the removable portion to the affixed portion.

2. A vehicle security system for securing a vehicle against theft, the vehicle comprising a hand brake lever with a brake lock button that is to be pressed to release the hand brake, the system comprising a driving function disablement component having an affixed portion and a removable portion, wherein the affixed portion is permanently affixed to the hand brake lever, and the removable portion is removably attached to the affixed portion, such that the removable portion blocks access to the brake lock button when attached to the affixed portion, and access to the brake lock button is allowed when the removable portion is removed from the affixed portion, wherein the removable portion is connected to the affixed portion with a hinge, such that swiveling the removable portion allows a driver to access and press the brake lock button.

3. A system for securing a vehicle against theft, the vehicle comprising a hand brake lever with a brake lock button that is pressed to release the hand brake, the system comprising:
   an affixed portion, configured to substantially permanently affix to the hand brake lever;
   a lock box, attached to the affixed portion to block access to the brake lock button, and
   a locking mechanism, having a closed position, in which the locking mechanism locks the lock box to the affixed portion, and an open position, in which the lock box is movable in respect of the affixed portion so as to allow driver's access to the brake lock button.

4. The system of claim 3, wherein the locking mechanism comprises a curved extension, and wherein in the closed position of the locking mechanism, the curved extension is curved around the brake lock button so as to lock the lock box to the affixed portion.

5. The system of claim 4, wherein the curved extension is rotatable to a position where the curved extension is curved away from the brake lock button.

6. A method of securing a vehicle against theft, the vehicle comprising a hand brake lever with a brake lock button that is pressed to release the hand brake, the system comprising:
   permanently affixing an affixed portion to the hand brake lever;
   attaching to the affixed portion a lock box, which blocks driver's access to the brake lock button, and
   locking the lock box with a locking mechanism, having a closed position, in which the locking mechanism locks the lock box to the affixed portion, and an open position, in which the block box is movable in respect of the affixed portion to a position that allows a driver to access and press the brake lock button.

* * * * *